US010650471B2

United States Patent
Young

(10) Patent No.: US 10,650,471 B2
(45) Date of Patent: *May 12, 2020

(54) IMAGE TAGGING FOR CAPTURING INFORMATION IN A TRANSACTION

(71) Applicant: Microsoft Technology Licensing, LLC, Redmond, WA (US)

(72) Inventor: Kyle S. Young, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/695,724

(22) Filed: Sep. 5, 2017

(65) Prior Publication Data
US 2018/0089765 A1 Mar. 29, 2018

Related U.S. Application Data

(63) Continuation of application No. 14/194,432, filed on Feb. 28, 2014, now Pat. No. 9,786,016.

(51) Int. Cl.
| | | |
|---|---|---|
| G06Q 10/10 | (2012.01) | |
| G06Q 40/00 | (2012.01) | |
| G06Q 10/06 | (2012.01) | |
| G06F 3/0484 | (2013.01) | |
| G06F 17/24 | (2006.01) | |
| G06K 9/00 | (2006.01) | |

(52) U.S. Cl.
CPC .......... *G06Q 40/12* (2013.12); *G06F 3/0484* (2013.01); *G06F 17/243* (2013.01); *G06K 9/00671* (2013.01); *G06Q 10/06398* (2013.01); *G06Q 10/10* (2013.01)

(58) Field of Classification Search
None
See application file for complete search history.

(56) References Cited

U.S. PATENT DOCUMENTS

| | | |
|---|---|---|
| 6,747,679 B1 | 6/2004 | Finch et al. |
| 6,826,542 B1 | 11/2004 | Virgin et al. |
| 6,844,990 B2 | 1/2005 | Artonne et al. |
| 7,386,478 B2 | 6/2008 | Viswanath |
| 7,617,245 B2 | 11/2009 | De Souza et al. |
| 7,644,013 B2 | 1/2010 | Nastacio et al. |
| 7,685,010 B2 | 3/2010 | Goldberg et al. |
| 7,809,722 B2 | 10/2010 | Gokturk et al. |
| 7,840,495 B2 | 11/2010 | Levenson et al. |
| 8,224,747 B2 | 7/2012 | Kumar et al. |

(Continued)

FOREIGN PATENT DOCUMENTS

CN            101833731 A     9/2010

OTHER PUBLICATIONS

"Final Office Action Issued in U.S. Appl. No. 14/194,432", dated Jul. 8, 2016, 24 Pages.

(Continued)

*Primary Examiner* — Paul Danneman
(74) *Attorney, Agent, or Firm* — Christopher J. Volkmann; Kelly, Holt & Christenson, PLLC

(57) ABSTRACT

An image is captured within an application transaction. Identifying information corresponding to the captured image is obtained and displayed for user confirmation. The identifying information is entered into an appropriate place within the transaction.

20 Claims, 13 Drawing Sheets

(56) References Cited

U.S. PATENT DOCUMENTS

| | | | |
|---|---|---|---|
| 9,009,070 | B2 | 4/2015 | Young et al. |
| 9,786,016 | B2* | 10/2017 | Young .................... G06Q 40/12 |
| 2003/0033167 | A1 | 2/2003 | Arroyo et al. |
| 2003/0204427 | A1 | 10/2003 | Gune et al. |
| 2004/0019542 | A1 | 1/2004 | Fuchs et al. |
| 2004/0267595 | A1 | 12/2004 | Woodings et al. |
| 2005/0021428 | A1 | 1/2005 | Costello |
| 2005/0125274 | A1 | 6/2005 | Nastacio et al. |
| 2006/0106703 | A1 | 5/2006 | Del Rey et al. |
| 2006/0126620 | A1 | 6/2006 | Boner et al. |
| 2006/0149769 | A1 | 7/2006 | McCormack et al. |
| 2006/0240862 | A1 | 10/2006 | Neven et al. |
| 2007/0250258 | A1 | 10/2007 | Hager |
| 2008/0178116 | A1 | 7/2008 | Kim |
| 2009/0204897 | A1 | 8/2009 | Sogge et al. |
| 2009/0228312 | A1 | 9/2009 | Cazares et al. |
| 2010/0017314 | A1 | 1/2010 | Johnson et al. |
| 2010/0070497 | A1 | 3/2010 | Duplessis et al. |
| 2010/0082470 | A1* | 4/2010 | Walach .............. G06Q 20/0425 705/35 |
| 2010/0100463 | A1 | 4/2010 | Molotsi et al. |
| 2010/0306080 | A1 | 12/2010 | Trandal et al. |
| 2011/0050726 | A1 | 3/2011 | Suehiro |
| 2011/0052075 | A1 | 3/2011 | Comay et al. |
| 2011/0191217 | A1 | 8/2011 | Saiu et al. |
| 2011/0276484 | A1 | 11/2011 | Pearson et al. |
| 2011/0317885 | A1 | 12/2011 | Leung et al. |
| 2012/0129552 | A1 | 5/2012 | Skybey |
| 2012/0150572 | A1 | 6/2012 | Fredericks et al. |
| 2012/0185368 | A1 | 7/2012 | Schloter et al. |
| 2012/0239477 | A1 | 9/2012 | Cueli et al. |
| 2012/0259748 | A1 | 10/2012 | Young et al. |
| 2012/0271651 | A1 | 10/2012 | Gilbert et al. |
| 2012/0294495 | A1 | 11/2012 | Wren et al. |
| 2012/0324369 | A1 | 12/2012 | Safa |
| 2013/0085906 | A1 | 4/2013 | Cottingham et al. |
| 2013/0124605 | A1 | 5/2013 | Klaka et al. |
| 2013/0129218 | A1 | 5/2013 | Barrett et al. |
| 2013/0136720 | A1 | 5/2013 | Ehrenberg et al. |
| 2013/0163028 | A1 | 6/2013 | Klein et al. |
| 2013/0232041 | A1 | 9/2013 | Nuggehalli |
| 2013/0265400 | A1* | 10/2013 | Boncyk .................. G06K 9/228 348/62 |
| 2014/0282016 | A1 | 9/2014 | Hosier, Jr. |
| 2014/0372262 | A1 | 12/2014 | Young et al. |
| 2014/0372263 | A1 | 12/2014 | Young et al. |
| 2014/0372285 | A1 | 12/2014 | Young et al. |
| 2014/0372336 | A1 | 12/2014 | Young et al. |

OTHER PUBLICATIONS

"Non-Final Office Action Issued in U.S. Appl. No. 14/194,432", dated Dec. 22, 2016, 25 Pages.

"Non-Final Office Action Issued in U.S. Appl. No. 14/194,432", dated Jan. 22, 2016, 23 Pages.

"Notice of Allowance Issued in U.S. Appl. No. 14/194,432", dated Jun. 9, 2017, 9 Pages.

"Office Action Issued in European Patent Application No. 15710640.2", dated Oct. 24, 2017, 6 Pages.

"Oral Hearing Issued in European Patent Application No. 15710640.2", dated Apr. 20, 2018, 7 Pages.

"First Office Action and Search Report Issued in Chinese Patent Application No. 201580008863.6", dated Mar. 4, 2019, 12 Pages.

International Search Report and Written Opinion for International Application No. PCT/US 14/41814, dated Feb. 9, 2015, date of filing: Jun. 11, 2014, 12 pages.

SmartScan-Expensify Help dated May 12, 2013 retrieved Jan. 3, 2015, retrieved from http://web.archive.org/web/20130 512061655/ http://help.expensify.com/smartscan, 6 pages.

Bhattacharjee, Anirban, "Capture Rejection Reason Text from User Decision in Workflow", Published on: Mar. 15, 2013, Available at: http://www.saptechnical.com/Tutorials/Workflow/UD/Index.htm. 3 pages.

"Common SSHR Modules", Retrieved on: Jun. 20, 2013, Available at: http://docs.oracle.com/cd/E18727_01/doc.121/e13507/T311T17552.htm. 50 pages.

Coeus, Kuali, "Workflow Action Buttons", Retrieved on Jun. 20, 2013, Available at: http://researchadmin.iu.edu/EO/AppHelp/KC/default.htm?turl=Documents%2Fworkflowactionbuttons.htm. 2 pages.

"Concur User Guide", Published on: Jul. 5, 2009, Available at: http://www.ofs.mq.edu.au/docs/forms/finance_one/CONCUR%20QuickStart%20Guide%20V.5%20NEW%20INTERFACE.pdf, 21 pages.

Howitz, Carsten, "What Does Role-based User Interface in ERP Software Mean to Your Work?", Published on: Dec. 9, 2010, Available at: http://blog.simcrest.com/what-does-role-based-user-interface-in-erp-software-mean-to-your-work/, 3 pages.

"New in Coupa 9", Published on: May 1, 2013, Available at: http://www.coupa.com/solutions/new-in-coupa-9, 4 pages.

"Business Solution Alliance—ECONZ Wireless Mobile Business Solutions", Retrieved on: Jun. 20, 2013, Available at: http://business.verizonwireless.com/content/dam/b2b/resources/ECONZ_wireless.pdf, 4 pages.

"ClickTime Mobile App for iPhone™ and Android™", Published on: Apr. 13, 2012, Available at: http://www.clicktime.com/web-based/timesheet/mobile, 2 pages.

"DueTime—Time Tracking in a Smart and Convenient Way on Your iPhone", Published on: Mar. 4, 2012, Available at: http://innapps.bplaced.net/en/DueTime-TimeSheet-index.html, 3 pages.

"Replicon Mobile Solutions", Retrieved on: Jun. 20, 2013, Available at: http://www.replicon.com/time-bill-touch, 2 pages.

"TimeMan—Mobile Timesheets and Jobcards", Published on: May 18, 2008, Available at: http://www.timeman.info/, 2 pages.

Ocull, Heather, "Timesheet Improvements for End Users in Project Web App", Published on: Oct. 25, 2012, Available at: http://blogs.office.com/b/project/archive/2012/10/25/timesheet-improvements-for-end-users-in-project-web-app-2013.aspx, 4 pages.

"Timesheet Management", Published on May 17, 2010, Available at: http://www.openair.com/Timesheet-Management, 1 page.

International Search Report and Written Opinion for International Application No. PCT/US14/41812, dated Dec. 23, 2014, Date of Filing, Jun. 11, 2014, 12 pages.

"ExpenseWatch.com Mobile", Retrieved on: Jun. 21, 2013, Available at: https://itunes.apple.com/us/app/expensewatch.com-mobile/id459848993?mt=8.

"Introducing New Native Mobile Device Experiences", Published on: Mar. 18, 2013, Available at http://blogs.msdn.com/b/dax/archive/2013/03/18/companion-apps.aspx.

Lawler, Ryan, "New ExpenseCloud Mobile Apps Add Mileage Tracking, Detailed Receipt Info, and Line-Item Project Data": Published on: Sep. 17, 2012, Available at: http://techcrunch.com/2012/09/17/expensecloud-mobile-apps/.

"Expense Reporting", Published on: Mar. 25, 2012, Available at: https://www.concur.com/en-us/expense-report.

"Microsoft Advances Successful, Two-Tier ERP Strategy with Powerful, New ERP Solution", Published on: Aug. 16, 2011, Available at: http://www.microsoft.com/casestudies/Microsoft-Dynamics-AX-2012/Microsoft-Corporation/Microsoft-Advances-Successful-Two-Tier-ERP-Strategy-with-Powerful-New-ERP-Solution/4000010466.

International Search Report and Written Opinion for International Application No. PCT/US 14/41815; dated Jun. 10, 2015, date of filing: Jun. 11, 2014, 12 pages.

International Search Report and Written Opinion for International Application No. PCT/US 14/41810, dated Mar. 6, 2015, date of filing: Jun. 11, 2014: 12 pages.

Prosecution History for U.S. Appl. No. 14/021,836 including:Final Office Action dated Nov. 9, 2015, Amendment dated Sep. 17, 2015 and Non-Final Office Action dated Mar. 20, 2015, 36 pages.

Final Office Action for U.S. Appl. No. 14/021,843 dated Sep. 24, 2015, 20 pages.

Non-Final Office Action for U.S. Appl. No. 14/021,850 dated Oct. 8, 2015, 15 pages.

(56) References Cited

OTHER PUBLICATIONS

Prosecution History for U.S. Appl. No. 14/021,858 including: Response to Notice to File Corrected Application Papers dated Feb. 18, 2014 and Notice to File Corrected Application Papers dated Oct. 2, 2013, 5 pages.
Amendment dated Dec. 22, 2014 for U.S. Appl. No. 14/021,843, 14 pages.
Prosecution History of U.S. Appl. No. 14/021,843 including Non-Final Rejection dated Aug. 25, 2014, 10 pages.
Prosecution History for U.S. Appl. No. 14/021,843 including: Amendment dated Jun. 30, 2015 and Non-Final Office Action dated Mar. 30, 2015, 32 pages.
"Google Goggles", Published Date: Nov. 22, 2013 Available at: https://play.google.com/store/apps/details?id=com.google.android.apps.unveil& hl=en.
Muller, Ian E., "Scan Anything and Let Your Phone Do the Rest", Published Date: Oct. 25, 2011, Available at: http://www.technologyreview.com/news/425907/scan-anything-and-let-your-phone-do-the-rest/.
Viana, et al., "PhotoMap: Automatic Spatiotemporal Annotation for Mobile Photos", In Proceedings of the 7th International Conference on Web and Wireless Geographical Information Systems, Nov. 28, 2007, 15 pages.
International Search Report and Written Opinion for International Application No. PCT/US2015/017614, dated Apr. 13, 2015, date of filing: Feb. 26, 2015, 9 pages.
"Office Action Issued in European Patent Application No. 15710640.2", dated Dec. 5, 2017, 6 pages.
"Second Office Action Issued in US Patent Application No. 201580008863.6". dated Sep. 9, 2019, 8 Pages.

* cited by examiner

IMAGE TAGGING FOR CAPTURING
INFORMATION IN A TRANSACTION

CROSS-REFERENCE TO RELATED APPLICATION

The present application is a continuation of and claims priority of U.S. patent application Ser. No. 14/194,432, filed Feb. 28, 2014, the content of which is hereby incorporated by reference in its entirety.

BACKGROUND

Computer systems are currently in wide use. They often require users to input information in order to complete transactions.

By way of example, some such computer systems include business systems. Business systems can include enterprise resource planning (ERP) systems, customer relations management (CRM) systems, line-of-business (LOB) systems, among others. These types of business systems often have users enter detailed information in order to perform transactions, such as to submit expense reports, purchase requisitions, or timesheets, among a wide variety of other things.

As a more specific example, when a user of a business system wishes to file an expense report, the user normally needs to input identifying information that identifies what the expense was attributed to. For instance, when the user wishes to file an expense report for a business dinner, the user may need to identify the guests for the meal for which the expense was made.

As another specific example, where a foreman wishes to submit a group timesheet for laborers that worked on a construction project, the foreman may need to identify the particular workers who were on the crew for that day. In addition, for a given project, a foreman or other crew chief may need to identify a piece of equipment that was purchased or used during a given time period, to document that expense.

It is normally the responsibility of the person entering the transaction (such as submitting the expense report, the timesheet, etc.) to manually enter this information. This is not only a time consuming process, but it can be error prone. In addition, when the information is not entered immediately following the event, the user may not remember enough information to enter accurate transaction information.

The discussion above is merely provided for general background information and is not intended to be used as an aid in determining the scope of the claimed subject matter.

SUMMARY

An image is captured within an application transaction. Identifying information corresponding to the captured image is obtained and displayed for user confirmation. The identifying information is entered into an appropriate place within the transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
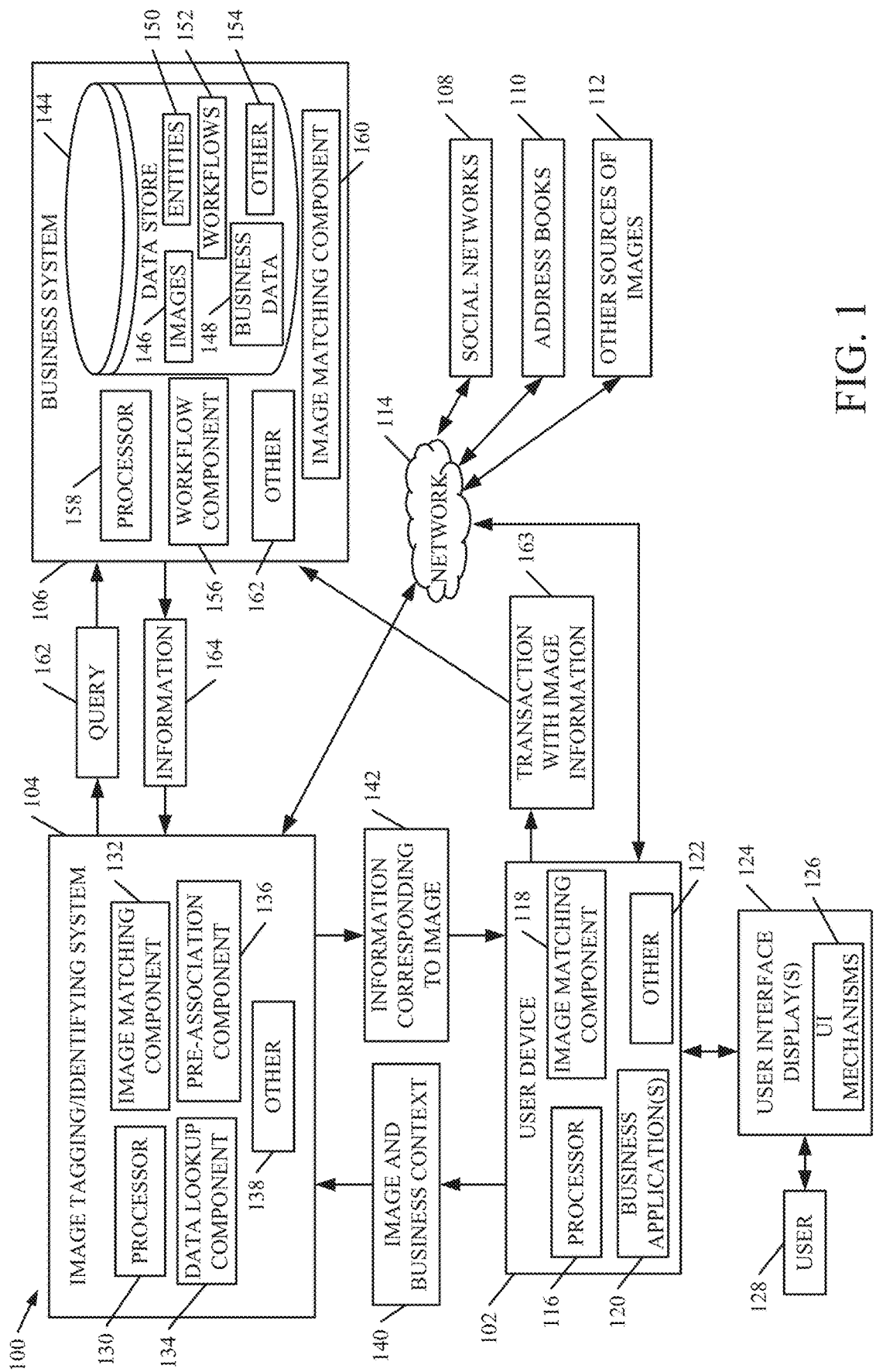
FIG. 1 is a block diagram of one illustrative embodiment of an image recognition architecture.

FIG. 1 is a block diagram of one illustrative image recognition architecture 100. Architecture 100 is shown with user device 102 in communication with image tagging/identifying system 104. System 104, itself, has access to business system 106, social networks 108, address books 110, and other sources of images 112. The various items in FIG. 1 can communicate with one another directly, or over network 114. Network 114 can be a local area network, a wide area network, or a variety of other different types of networks.

Before describing the operation of architecture 100 in more detail, a brief description of the items in architecture 100 will first be provided. In the embodiment shown in FIG. 1, user device 102 illustratively includes processor 116, image capture component 118 (such as a camera), one or more business applications 120, and it can include other items 122 as well. In one embodiment, business applications 120 illustratively generate user interface displays 124 with user input mechanisms 126 for interaction by user 128. User 128 can illustratively provide inputs using user input mechanisms 126 in order to manipulate and interact with business applications 120 and user device 102, as well as other systems that are in communication with device 102.

In one embodiment, business applications 120 include applications that allow user 128 to interact with, and perform transactions within, business system 106. For instance, in one embodiment, business applications 120 include an expense report application that allows user 128 to open, fill out and submit expense reports within business system 106. In another embodiment, business applications 120 include a timesheet application that allows user 128 to manipulate and submit timesheets within business system 106. In yet another embodiment, business applications 120 include a purchase requisition application that allows user 128 to fill out and submit purchase requisitions within business system 106. Further, business applications 120 can be any of a wide variety of other business applications that allow user 128 to perform transactions within business system 106.

FIG. 1 shows that, in one embodiment, image tagging/identifying system 104 illustratively includes processor 130, image matching component 132, data lookup component 134, pre-association component 136, and it can include other items 138 as well. In one embodiment, pre-association component 136 allows a user to associate information with an image. By way of example, business system 106 may include images of employees of the organization that uses system 106, along with employee information corresponding to each image. Thus, pre-association component 136 allows a user to enter information corresponding to any of a wide variety of different types of images. Employee information corresponding to employee images is mentioned by way of example only, and other examples are described in greater detail below.

Image matching component 132 illustratively receives an image, possibly geographical location information corresponding to the image, and the corresponding business context (represented by number 140) from user device 102 and matches the image against images in various sources of images (such as business system 106, social networks 108, address books 110, or other sources 112). Once an image match is found, data lookup component 134 looks up information corresponding to the matched image and returns the information 142 to the user device 102 that submitted the image and business context 140.

Business system 106 can include any of a wide variety of different business systems. It illustratively includes (or has access to) a data store 144 which, itself, includes images 146, business data 148 (which can include data corresponding to images 146), entities 150, workflows 152 and it can include other business data or records 154 as well. Entities 150 illustratively include data records that represent individual items within business system 106. For example, a customer entity represents and describes a customer, an inventory item entity represents and describes an item of inventory, an employee entity represents and describes an employee, a vendor entity represents and describes a vendor, etc.

Workflows 152 are executed by workflow component 156 in business system 106. When executed, the workflows 152 illustratively allow user 128 to perform various tasks or activities within business system 106, in order to conduct his or her business.

FIG. 1 also shows that business system 106 illustratively includes processor 158, image matching component 160, and it can include other items 162 as well. Image matching component 160 illustratively receives a query 162 from image tagging/identifying system 104, that includes an image. Image matching component 160 matches the image in query 162 against images 146 in data store 144 of business system 106. When a match is found, component 160 illustratively returns information 164 corresponding to the matched image to system 104. Data lookup component 134 then sends the information 164 corresponding to the image on to user device 102, as represented by item 142. User 128 can enter the information in a transaction user interface display 128 to perform a transaction and submit the transaction to business system 106 as indicated by block 163 in FIG. 1.

Figure 2:
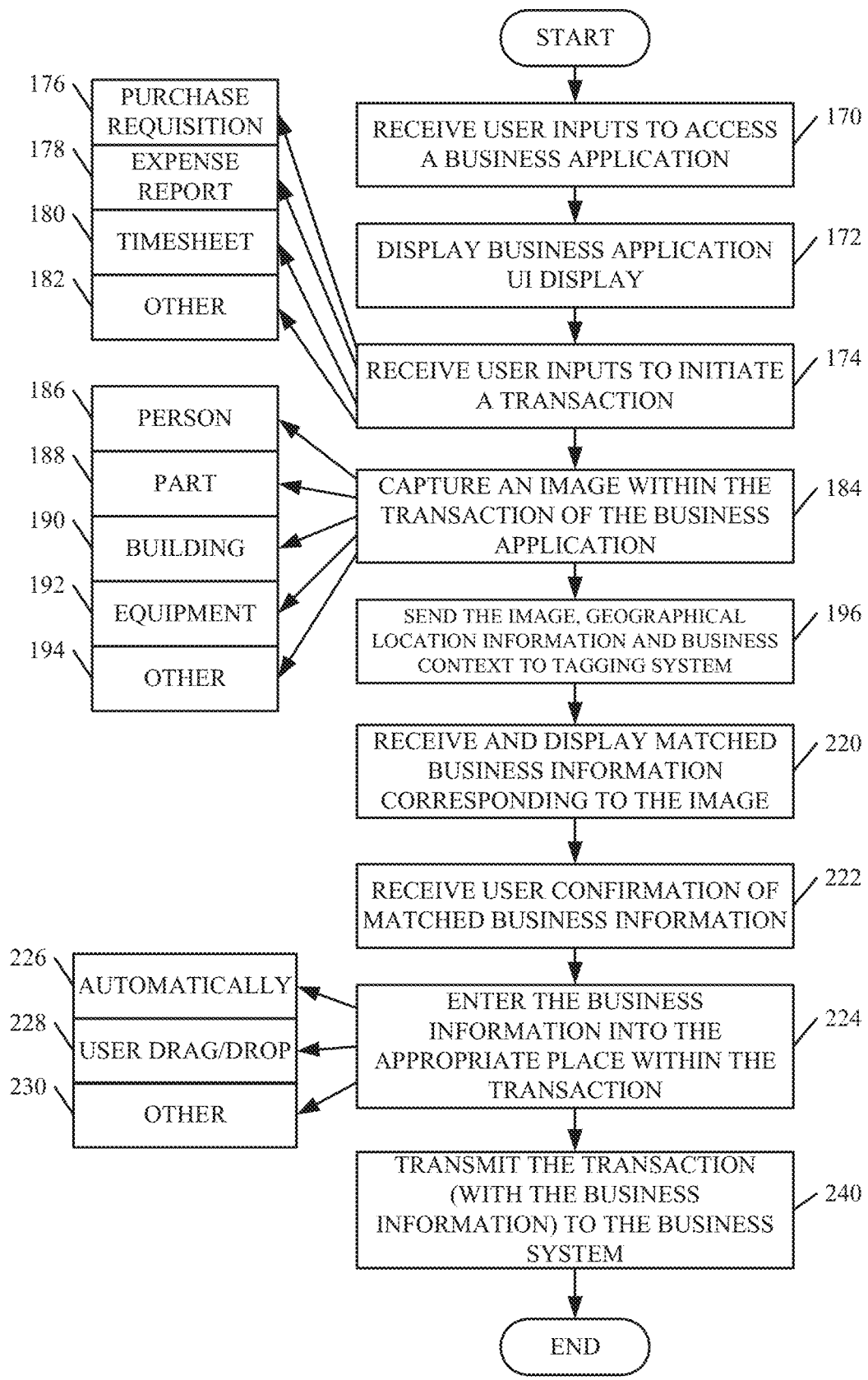
FIG. 2 is a flow diagram illustrating one embodiment of the overall operation of the architecture shown in FIG. 1.

The overall operation of architecture 100 in allowing user 128 to perform a transaction by inputting an image and receiving the corresponding information will now be described in greater detail. FIG. 2 shows one illustrative flow diagram that illustrates this.

In the embodiment shown in FIG. 1, user device 102 first receives a user input indicating that the user wishes to access a business application 120. This is indicated by block 170 in FIG. 2. The user device 102 then illustratively displays a business application user interface display that allows user 128 to take certain actions within the corresponding business application. This is indicated by block 172 in FIG. 2. The business application then receives user inputs to initiate a transaction. This is indicated by block 174.

By way of example, where the business application 120 is a purchase requisition application, a transaction user interface display may allow the user to initiate a purchase requisition transaction 176. Where it is an expense report application, it may generate a transaction user interface display that allows the user to prepare and submit an expense report 178. Where it is a timesheet application, it can generate a transaction user interface display that allows the user to enter time in a timesheet 180 and submit the timesheet. Of course, it can generate a user interface display to allow the user to perform other transactions 182 as well.

Figure 3:
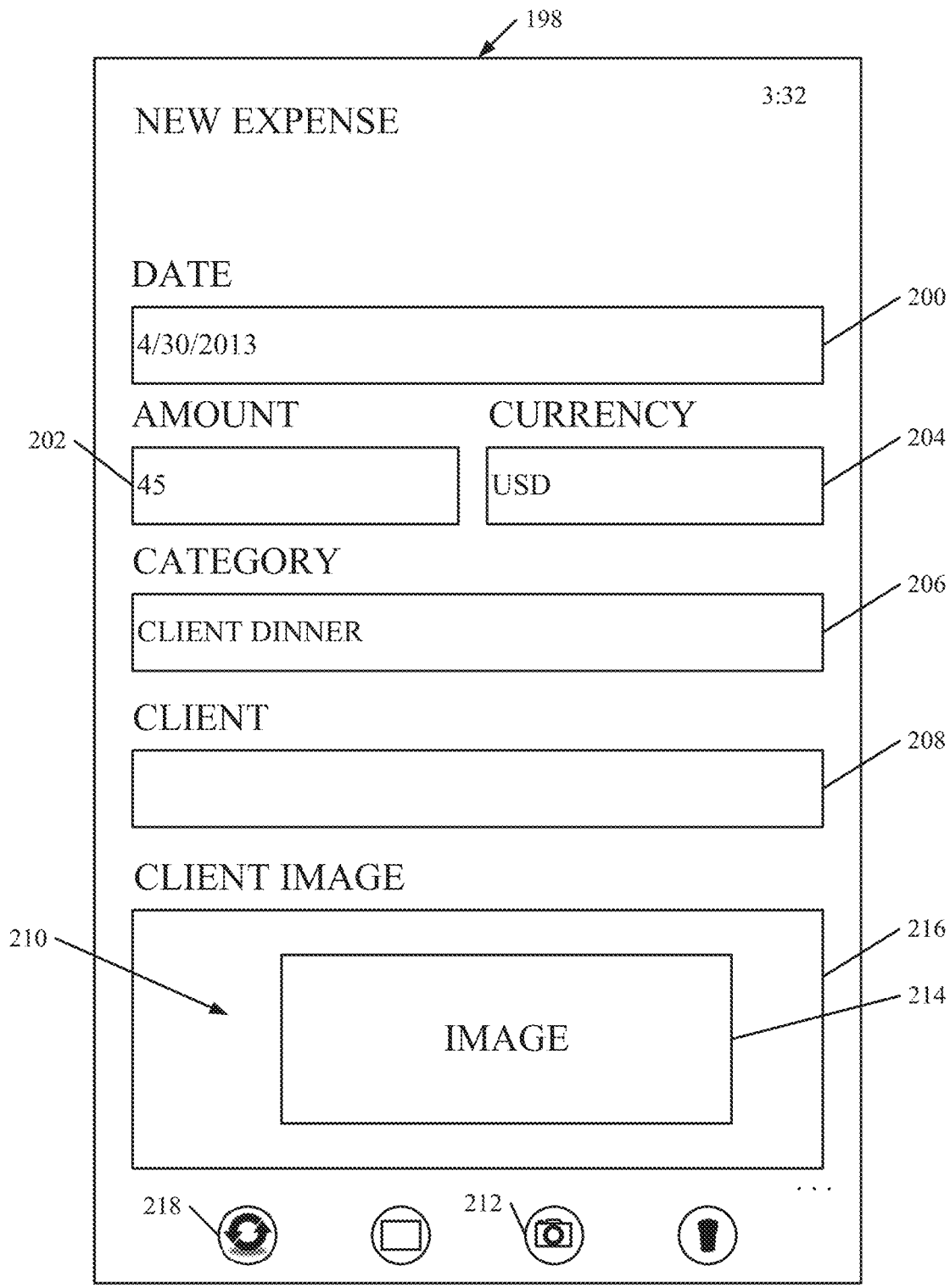
FIGS. 3 and 4 show exemplary user interface displays.

Before continuing with a description of FIG. 2, one exemplary user interface will be described. FIG. 3 shows one embodiment of an exemplary user interface display 198 that can be generated by a business application 120 in order to allow a user to enter an expense item in an expense report. It can be seen that the user interface display 198 displays a date field 200, an amount field 202, a currency indicator field 204, an expense category field 206, a client field 208 and an image capture portion 210. Date field 200 allows the user to enter a date that the expense was made. Amount field 202 allows the user to enter the amount of the expense and currency field 204 allows the user to specify the currency. Category field 206 allows the user to select, or enter, an expense category. In this case, it can be seen that the user has entered "client dinner" as the expense category. Client field 208 illustratively allows the user to identify the particular client that was entertained at dinner. It may be that the user does not know all of the specifics for the client (e.g., the person's full name, title, etc.). Therefore, in that case, the user simply uses the camera functionality indicated by user input mechanism 212, in order to take a picture of the person that the user is entertaining. When this happens, the image 214 of that person is displayed in image display section 216. Geographical location information that identifies the location of the image can also be attached to the image. The user can then save the image for later use, or actuate a suitable user input mechanism such as mechanism 218 in order to transmit that image, along with the business context, and geographical information to image tagging/identifying system 104.

In the course of performing the transaction, user 128 illustratively manipulates image capture component 118 (such as the camera function on a mobile device) to capture an image, within the transaction of the business application. This is indicated by block 184. By way of example, where user 128 is filling out an expense report 178 involving a business dinner, the user may wish to capture the image of a person 186 to identify who the user entertained or took to dinner. In another embodiment, the user may capture an image of a mechanical part 188 where the user is filling out a purchase requisition. The user may capture an image of a building 190, with its corresponding geographical location information, so that the user can receive information identifying a particular project that is being performed at that site. Where the user has purchased or rented equipment, the user may capture an image of the equipment 192. Of course, the user may capture other images 194 as well.

The business application 120 then sends the captured image, geographical location information, and the business context to image tagging/identifying system 104. This is indicated by block 196 in FIG. 2. The business context illustratively identifies the business application and a particular context the business application is currently in. For instance, if the user is filling out an expense report and has indicated that the expense is an entertainment expense and further where the user has captured an image of a person, the business application 120 illustratively sends the image of the person along with the business context (e.g., indicating that the user is attempting to fill out an expense report for entertainment) to system 104.

In response, system 104 obtains the information corresponding to the image, given the specified context and geographical location information. This is done by searching through various sources of images, such as business system 106, social networks 108, address books 110 and other sources 112. This is described in greater detail below with respect to FIG. 2A. Suffice it to say, for now, that system 104 obtains the information corresponding to the image that was submitted by the business application 120. The images searched or the information obtained can be filtered or otherwise processed based on the business context and geographical location.

System 104 transmits that information back to user device 104. The business application 120 receives and displays the matched business and location information corresponding to the image. This is indicated by block 220 in the flow diagram of FIG. 2. The business application then receives user confirmation of the matched business information. This is indicated by block 222. The confirmed business information is then entered into the appropriate place within the transaction user interface display for the transaction currently being conducted by the business application 120. This is indicated by block 224. Entering the information can be done automatically by the business application as indicated by block 226 (in response to user confirmation). It can be done manually by the user (such as having the user drag and drop the information into the appropriate place) as indicated by block 228, or it can be done in other ways as well, as indicated by block 230.

Figure 4:
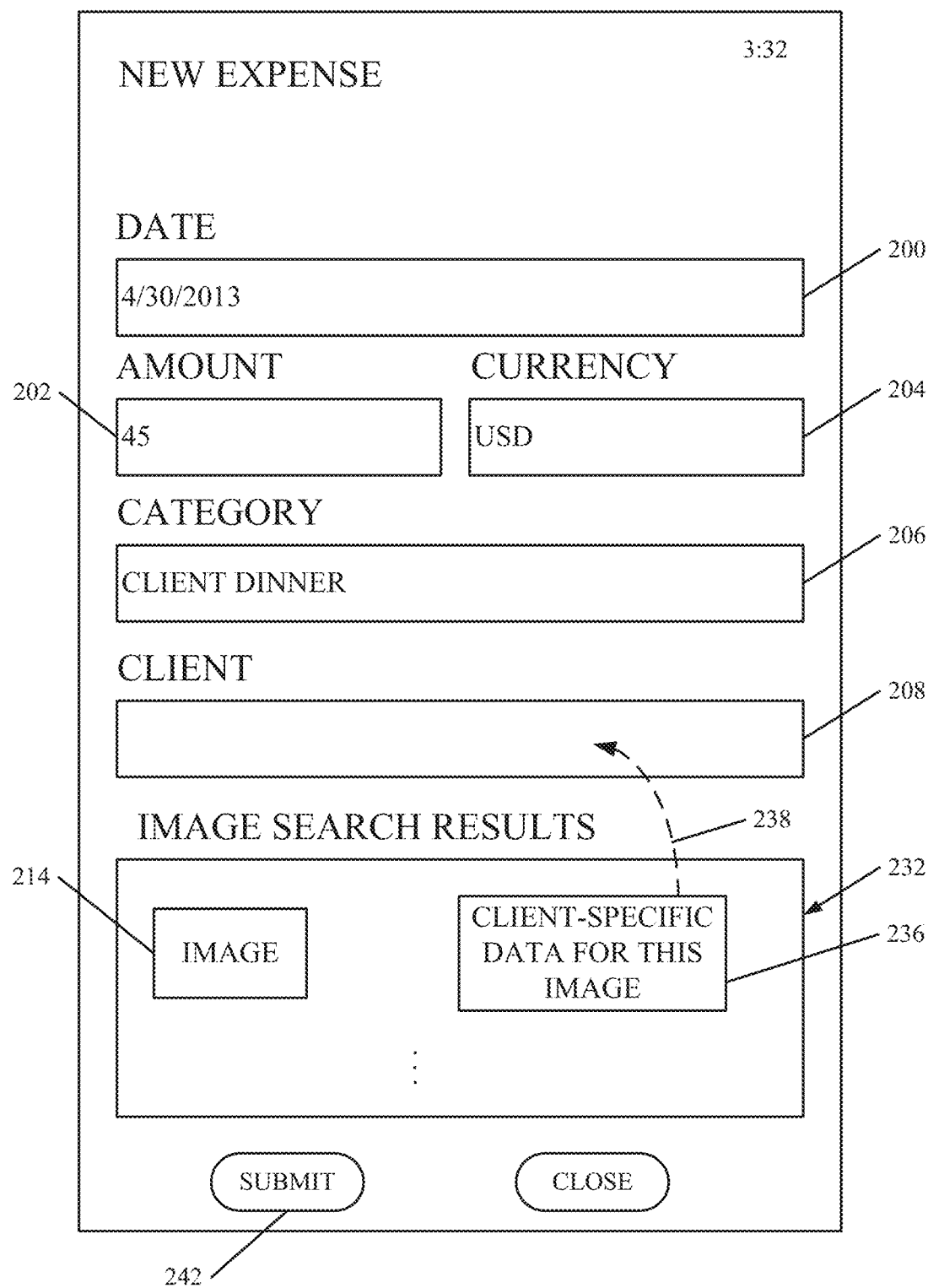

FIG. 4 shows one exemplary user interface display that indicates this. It can be seen that a number of the items shown in FIG. 4 are similar to those shown in FIG. 3, and they are similarly numbered. However, it can be seen that the user interface display in FIG. 4 does not display the client image portion 210, but instead displays an image search results portion 232. Search results portion 232 illustratively displays the captured image along with the information corresponding to that image 214 that was returned by system 104.

In the embodiment shown in FIG. 4, the information corresponding to image 214 is client-specific data that identifies the individual, and the company for whom that individual works. This information is indicated by block 236 in FIG. 4. In one embodiment, the user confirms this information by simply tapping on it, and the client-specific data is automatically entered into the client field 208. In another embodiment, this is done manually. For instance, the user can drag and drop the client-specific data 236 from display portion 232 into field 208. In any case, the returned information is placed in the appropriate spot, as indicated by arrow 238 in FIG. 4.

Once user 128 has used the information corresponding to the image, in the particular transaction, user 128 illustratively sends the transaction, with that information, to the business system corresponding to the business application 120 that is currently being run. This is indicated by block 240 in the flow diagram of FIG. 2. The user can illustratively do this by actuating a suitable user input mechanism. In the example shown in FIG. 4, the user can simply actuate the submit button 242. Sending the transaction along with the image information to business system 106 is also indicated by block 163 in the architectural diagram of FIG. 1.

Figure 2A:
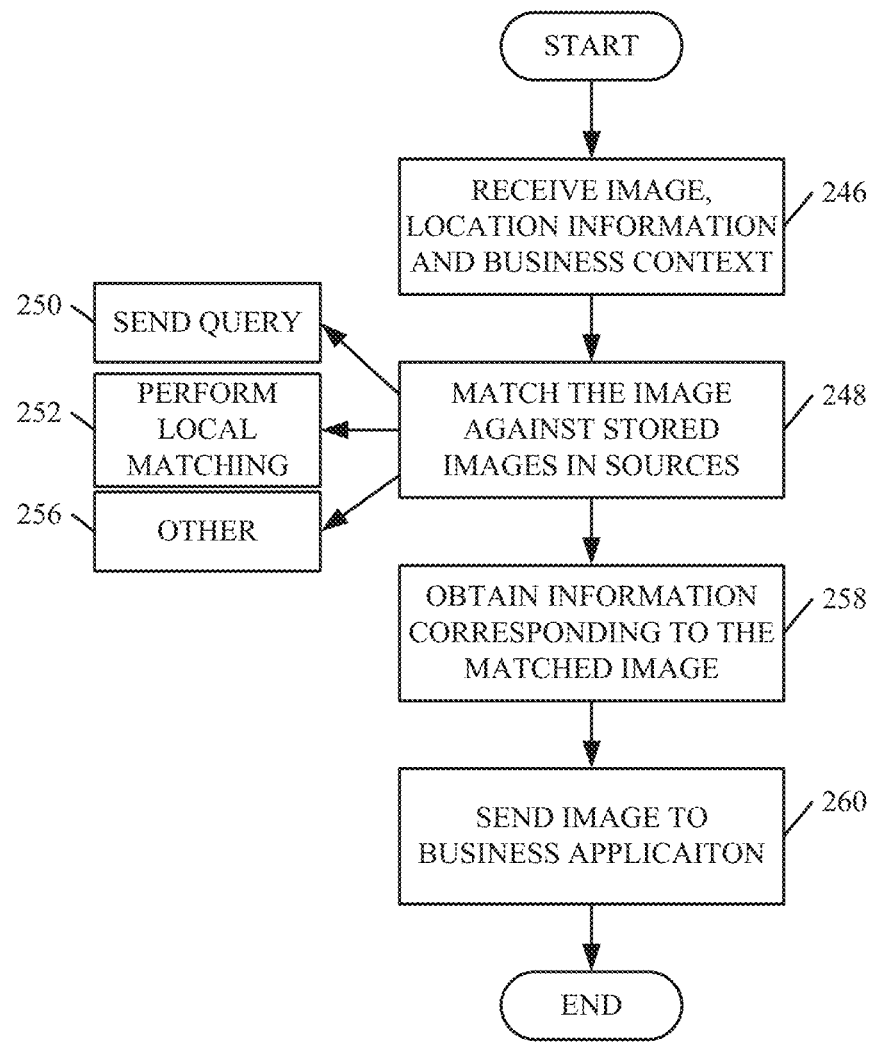
FIG. 2A is a flow diagram showing one embodiment of the operation of the architecture shown in FIG. 1 in matching and tagging images.

FIG. 2A is a flow diagram illustrating one embodiment of the operation of image tagging/identifying system 104 in matching the received image to obtain corresponding information. In one embodiment, system 104 first receives the image, along with its geographical location information and business context 140 from the business application 120 on user device 102. This is indicated by block 246 in FIG. 2A.

The image matching component 132 then matches the received image against stored images in various sources. This is indicated by block 248. In one embodiment, image matching component 132 uses the business context and geographical location information submitted by user device 102 to identify the particular sources through which it should search for a matching image. For instance, where the business context information indicates that it is an expense report transaction in an expense report application, image matching component 132 illustratively first begins searching for images within business system 106. Where a different context is indicated, it can begin searching in other sources, such as social networks 108, address books 110 or other sources 112. Also, where the image is a piece of equipment, it can identify a job site where that equipment is being used, based on the location information. Also, where the image is a person and the business context is to fill out a crew timesheet entry, component 132 can identify the employee and billing rate from the image, and the project from the location information.

It should also be noted that image matching component 132 can perform the actual matching process in a variety of different ways. For instance, it can send a query 162 (shown in FIG. 1) with the image, location and business context information to business system 106 which, itself, can contain an image matching component 160. Component 160 can then perform matching within business system 106 and return corresponding information 164. Sending a query to match the received image is indicated by block 250 in the flow diagram of FIG. 2A.

In another embodiment, image matching component 132 directly accesses images 146 in business system 106 and performs the matching itself. In yet another embodiment, it accesses images that are locally stored (or accessible by) system 104 and performs the matching process locally. This is indicated by block 252.

Image matching component 132 can perform matching in a variety of other ways as well. This is indicated by block 256 in the flow diagram of FIG. 2A.

In any case, image matching component 132 illustratively identifies a matching image. In that case, data lookup component 134 illustratively retrieves the corresponding business information, corresponding to the matched image. It can do this by sending appropriate queries to the source of the matched image, or it can perform a local lookup on a local data store that contains the information. Obtaining information corresponding to the matched image is indicated by block 258 in FIG. 2A.

System 104 returns the information corresponding to the image to the requesting business application 120 in user device 102. This is indicated by block 260 in FIG. 2A.

Figure 2B:
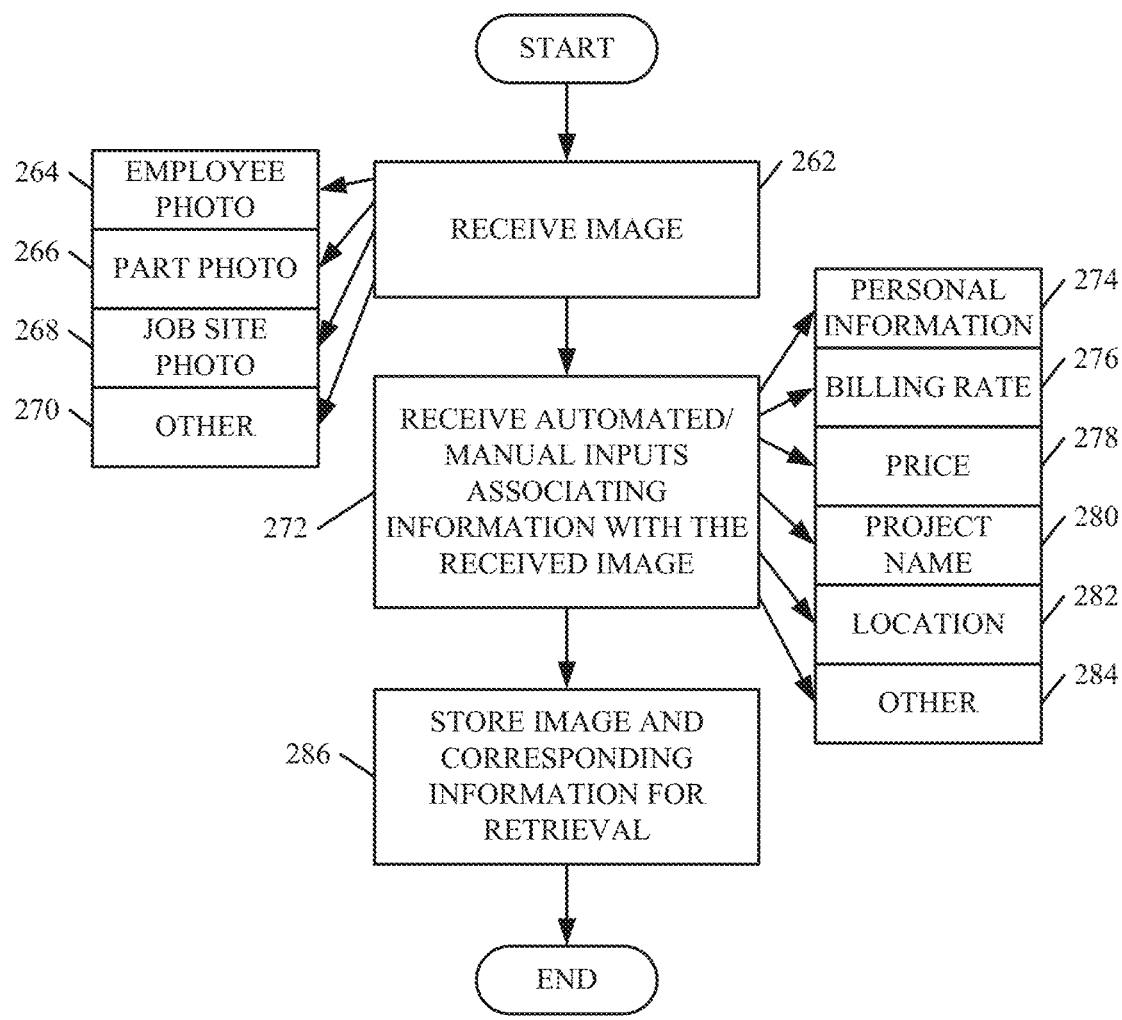
FIG. 2B is a flow diagram showing one embodiment of the operation of the architecture shown in FIG. 1 in pre-associating images with corresponding information.

FIG. 2B is a flow diagram illustrating one embodiment of the operation of pre-association component 136 in receiving images and associating information with them, so that the information can be surfaced in response to later searching. In one embodiment, pre-association component 136 illustratively receives an image. This is indicated by block 262 in FIG. 2B. The images can be a wide variety of different kinds of images. For instance, where the pre-association component 136 is associating information with employees of a company, the received image may be an employee photograph 264. Where it is associating information with inventory items in images corresponding to an inventory application, or a purchase requisition application, the image may be a photograph of a part, as indicated by block 266.

Where the pre-association component 136 is associating information for various projects or work sites, the received image may be a photograph of a job site (such as a building or another photograph of a job site). This is indicated by block 268. The received images can be a wide variety of other images as well, and this is indicated by block 270.

Once the images are received, pre-association component 136 illustratively receives automated or manual inputs associating information with the received image. For instance, where the image is a photograph of a job site, a geographical location of that job site may be automatically associated with the image. Where the image is an employee photograph, then a user may manually enter the employee's name, billing rate, home address or other information. Where the image is a photograph of a part, a user may enter price information corresponding to the price of that part. Receiving automated or manual inputs associating information with the received image is indicated by block 272 in the flow diagram of FIG. 2B. Receiving personnel information is indicated by block 274. Receiving billing rate information is indicated by block 276. Receiving pricing information is indicated by block 278. Receiving project name information is indicated by block 280. Receiving location information is indicated by block 282. Of course, a wide variety of other information could be received as well, and this is indicated by block 284.

Once the information has been received, in association with the image, the image and the corresponding information are illustratively stored for later retrieval. This is indicated by block 286 in FIG. 2B. This can also be done in a variety of different ways. For instance, it can be stored locally in system 104. It can also be stored at the source of the image. By way of example, if a human resources employee is inputting personnel information for employee photographs in business system 106, the human resources person may be accessing pre-association component 136 to pre-associate the information with the photograph. However, the photograph and its corresponding information may be stored within business system 106, instead of local to system 104. All of these different architectures are contemplated herein.

It can thus be seen that an application on user device 102 (such as a mobile application on a mobile device) can be used with a business system to obtain identifying information based upon a captured image. A database lookup can be performed, based upon the captured image, and information that has been pre-associated with the captured image can be returned in response to the database lookup. The information can be returned to user a for user confirmation that the correct information has been obtained, and the user can also add additional information in the context of the image. For example, when the billing rate of an individual identified in a captured image is returned, the user can enter the number of hours worked in a timesheet application to perform a timesheet transaction. Geographical information associated with the image can also be used to perform additional lookups, such as to determine a job site location, or otherwise.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
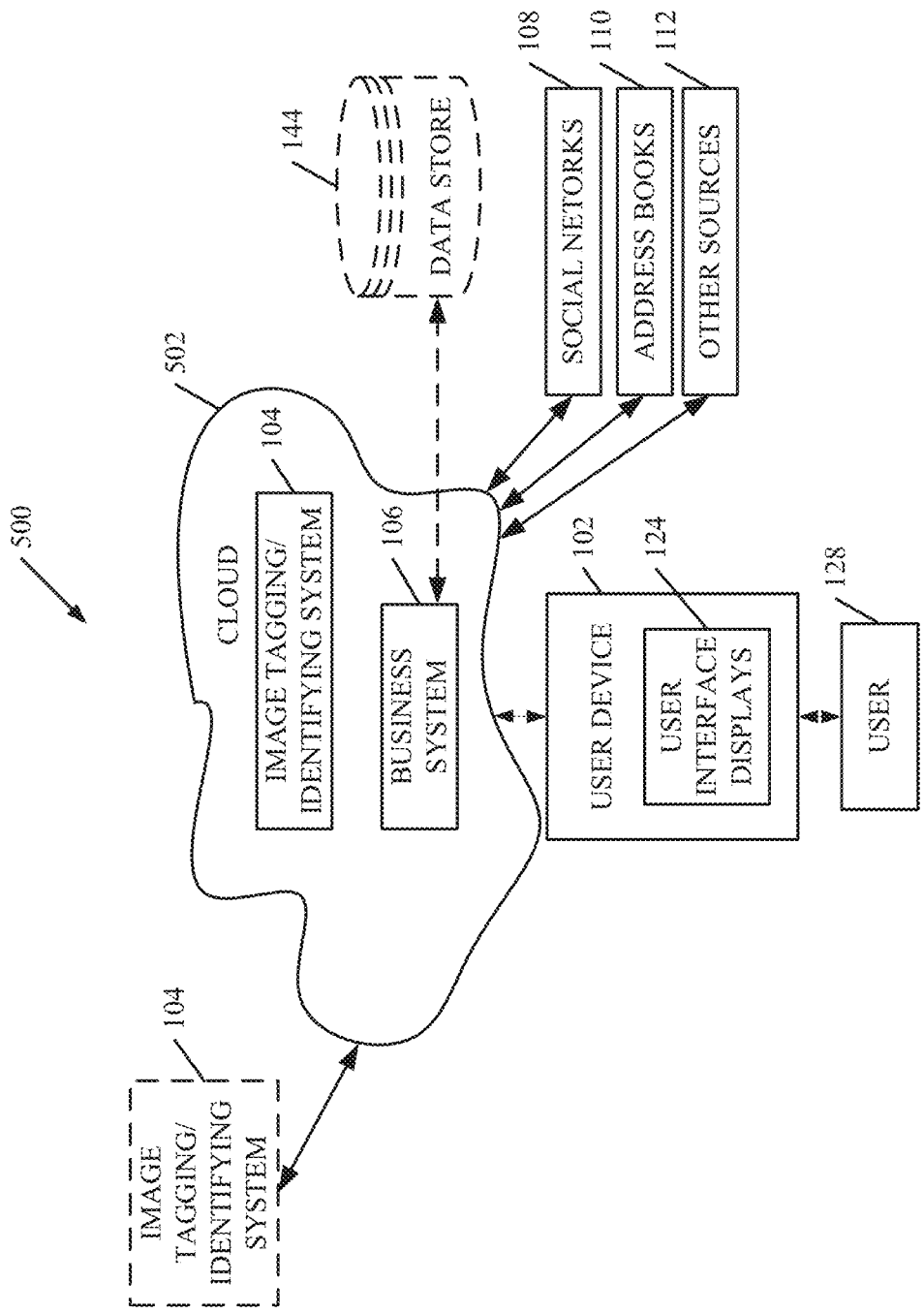
FIG. 5 is a block diagram showing the architecture of FIG. 1 deployed in a cloud-computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that business system 102 and image tagging/identifying system 104 can be located in cloud 502 (which can be public, private, or a combination where portions are public while others are private). Therefore, user 128 uses a user device 102 to access those systems through cloud 502.

FIG. 5 also depicts another embodiment of a cloud architecture. FIG. 5 shows that it is also contemplated that some elements of architecture 100 can be disposed in cloud 502 while others are not. By way of example, data store 144 can be disposed outside of cloud 502, and accessed through cloud 502. In another embodiment, image tagging/identifying system 104 can also be outside of cloud 502. Regardless of where they are located, they can be accessed directly by device 102, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
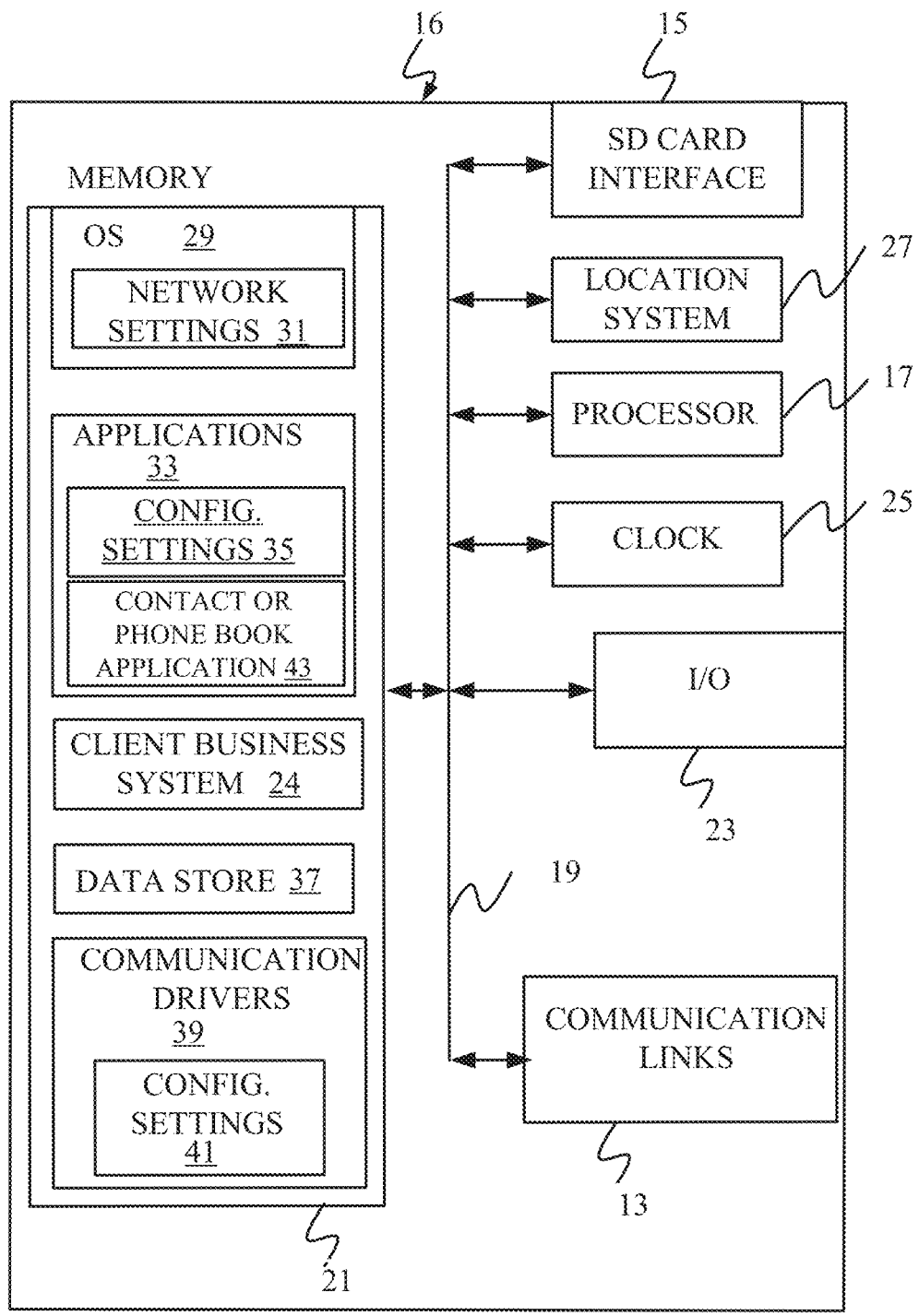
FIGS. 6-10 show various embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-10 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 116, 130 or 158 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
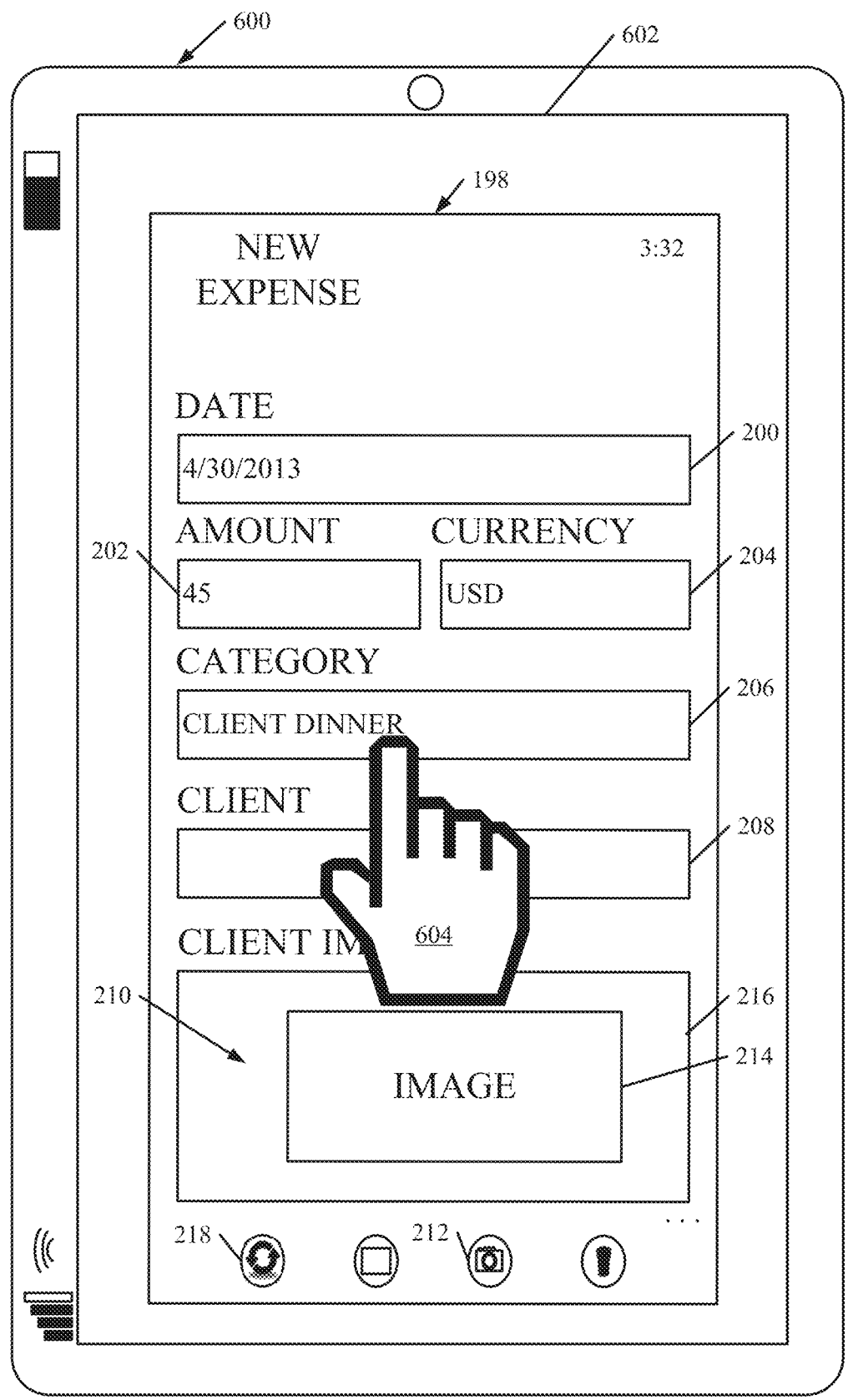

FIG. 7 shows one embodiment in which device 16 is a tablet computer 600. In FIG. 7, computer 600 is shown with the user interface display from FIG. 3 displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
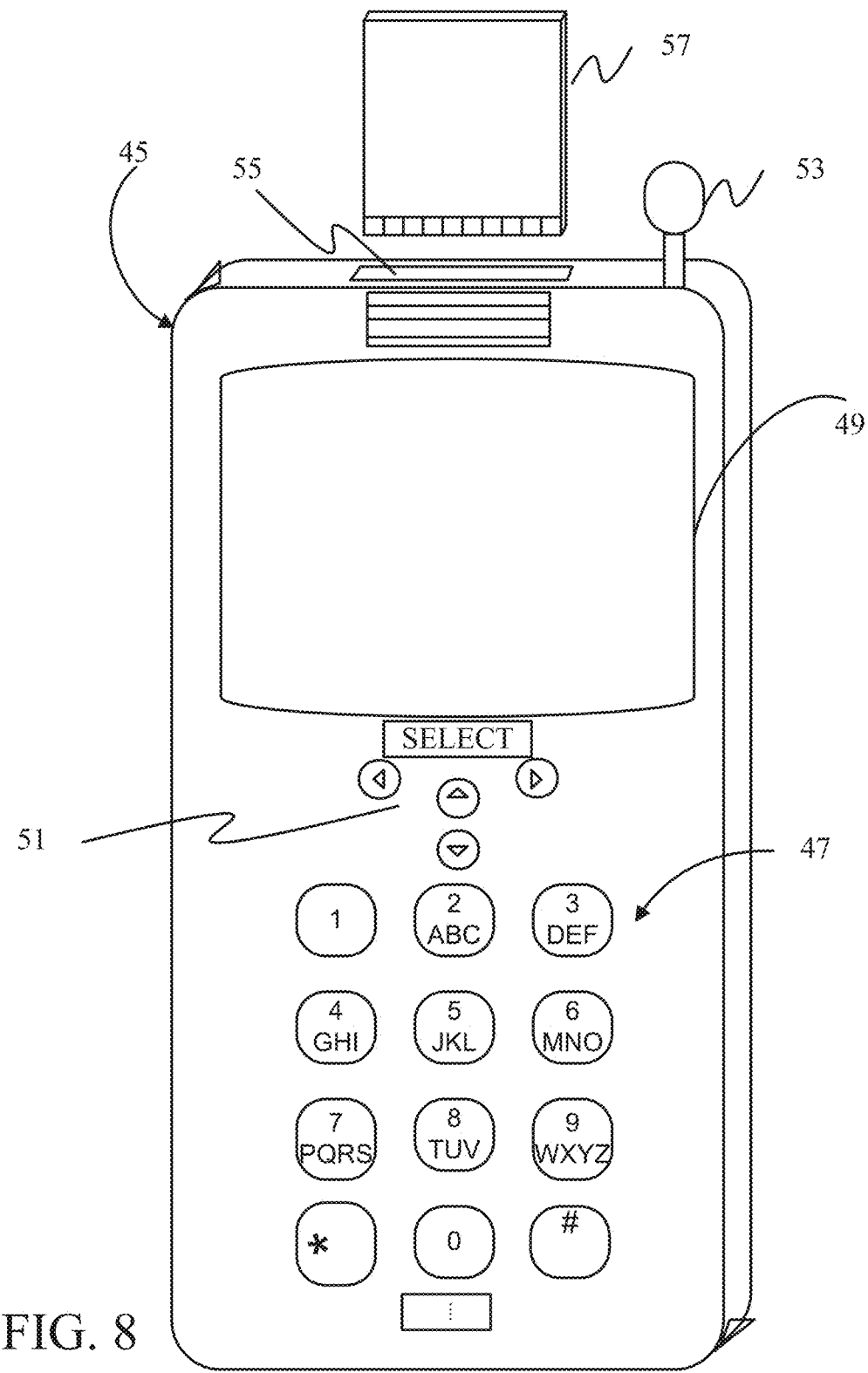
Figure 9:
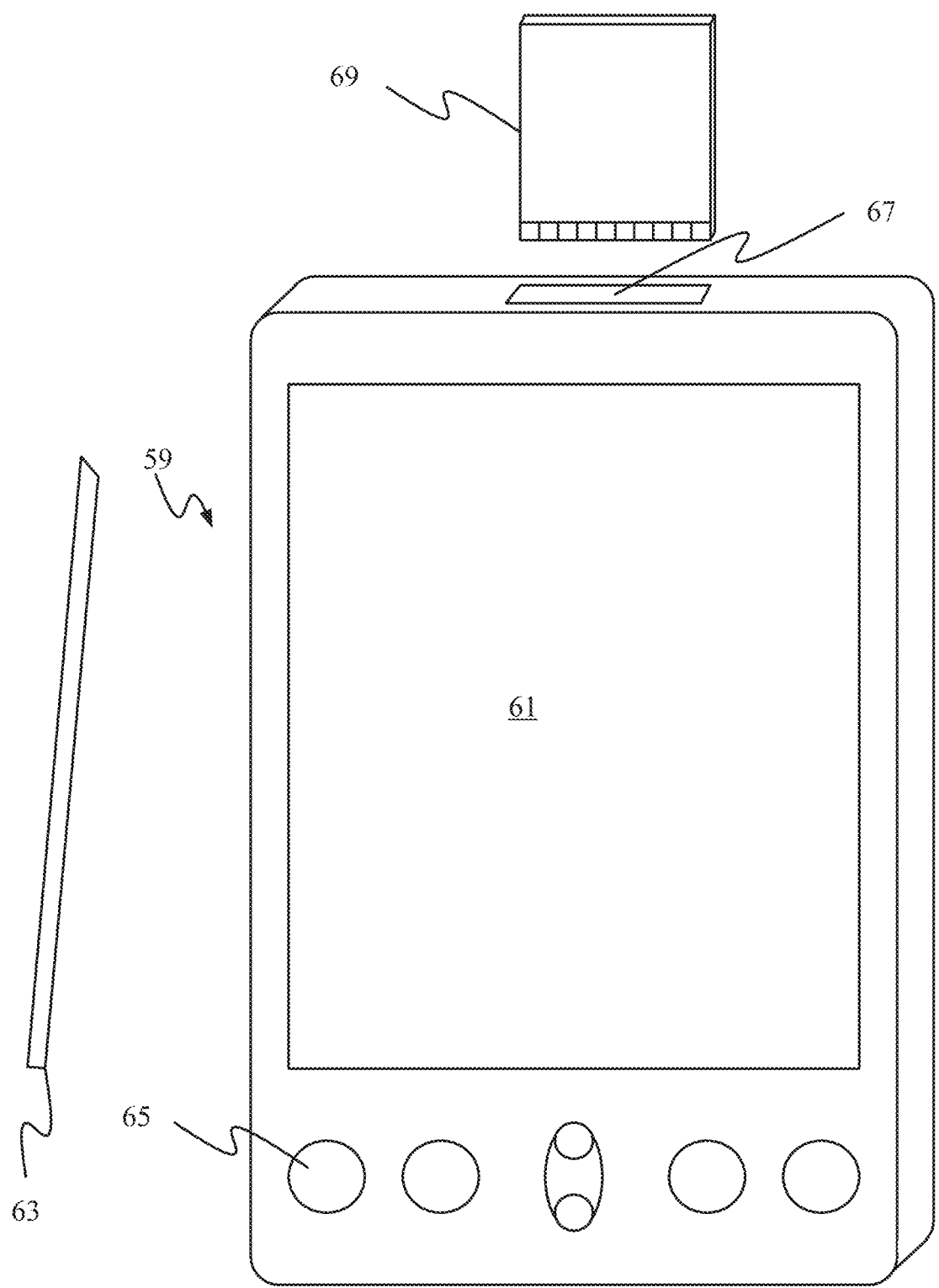

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
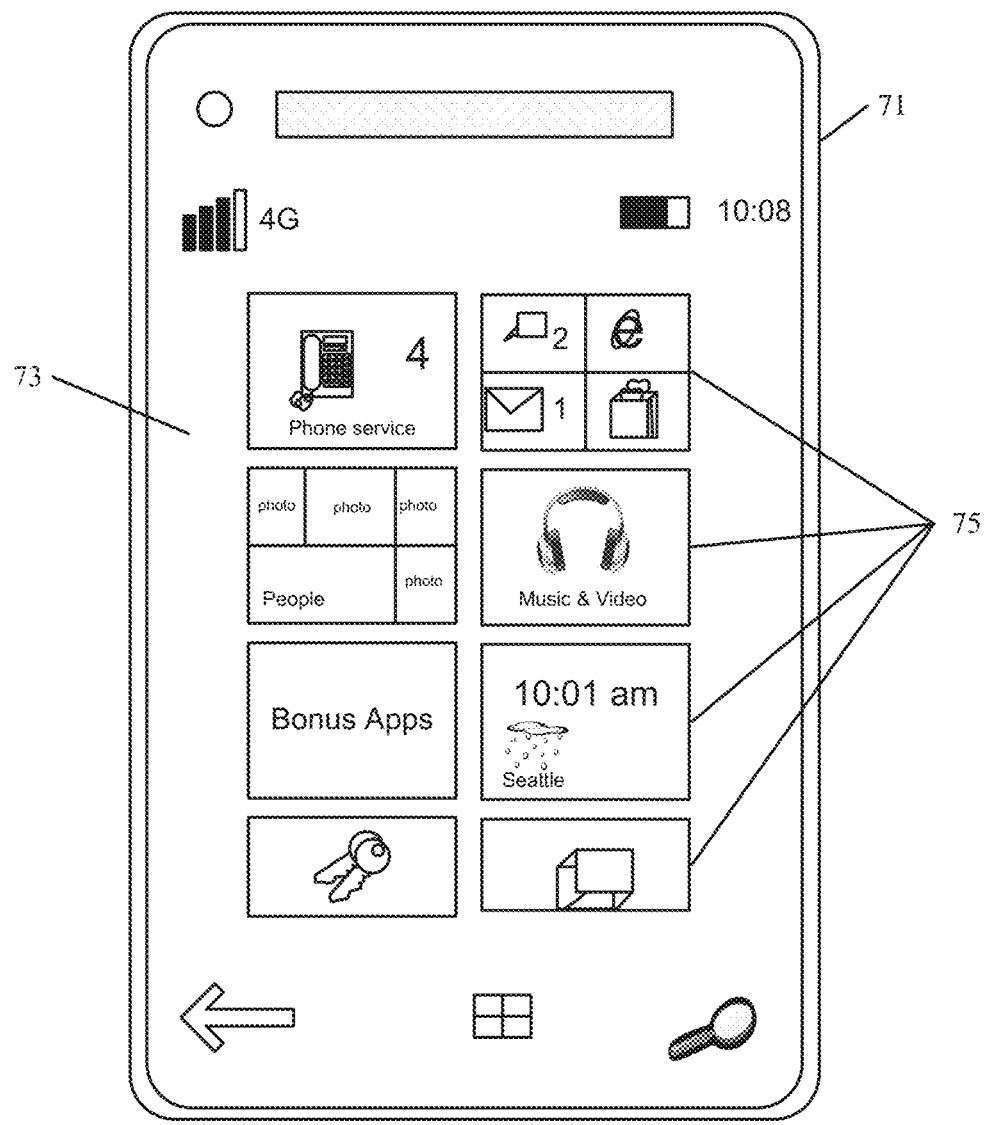

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
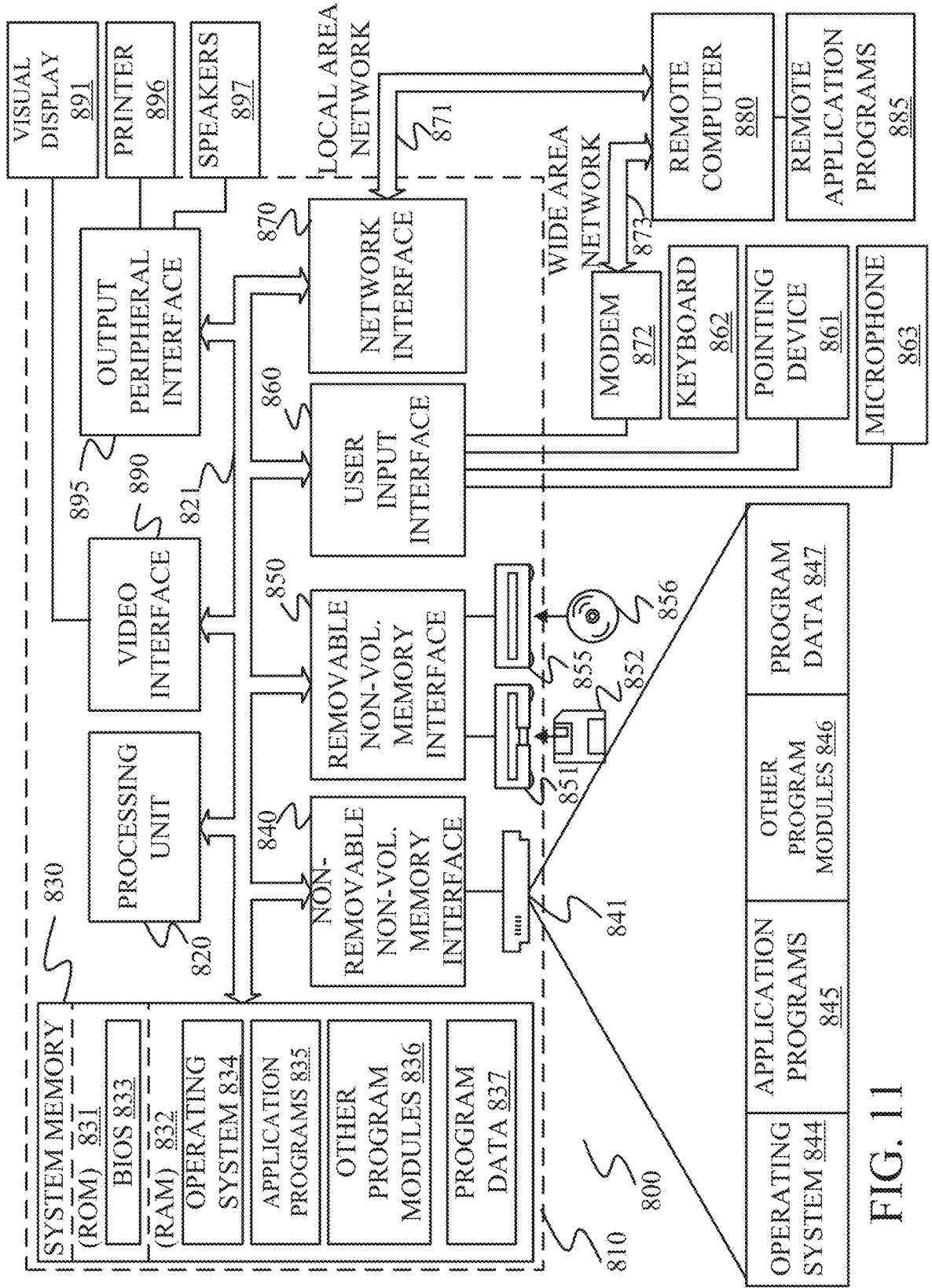
FIG. 11 is a block diagram of one illustrative computing environment.

FIG. 11 is one embodiment of a computing environment in which architecture 100, or parts of it, (for example) can be deployed. With reference to FIG. 11, an exemplary system for implementing some embodiments includes a general-purpose computing device in the form of a computer 810. Components of computer 810 may include, but are not limited to, a processing unit 820 (which can comprise processor 116, 130 or 158), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 11 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor; and
memory storing instructions executable by the processor, wherein the instructions configure the computing system to:
  receive, from a client device that is remote from the computing system:
    image data representing a first image associated with an application on the client device; and
    context data that identifies an operational context of the application and is indicative of a task to be performed in the application relative to the first image;
  based on the first image and the application context, select, from an image source, a second image based on a correspondence between the second image and the first image;
  obtain information associated with the second image; and
  send the second image and the information to the client device.

2. The computing system of claim 1, wherein the context data comprises non-image data that is received from the client device in addition to the image data, and the context data identifies a user-selected operation in the application on the client device.

3. The computing system of claim 2, wherein the instructions configure the computing system to:
based on the application context, select a subset of information from a set of information associated with the second image; and
send the second image and the subset of information to the client device.

4. The computing system of claim 1 wherein the instructions configure the computing system to:
receive a plurality of images;
associate each of the plurality of images with corresponding information; and
store the plurality of images along with the associated information in the image source.

5. The computing system of claim 1 wherein the application context indicates a geographical location associated with the client device, and the instructions configure the computing system to:
obtain, from the image source, information associated with the geographical location.

6. A computing system comprising:
a processor; and
memory storing instructions executable by the processor, wherein the instructions, when executed, configure the computing system to:
  receive an image associated with an application on a client device that is remote from the computing system;
  determine an application context that is associated with the first image and indicative of a task to be performed in the application relative to the first image;
  based on the application context, select an image source from a plurality of image sources;
  identify a second image that is stored in association with the selected image source and corresponds to the first image;
  obtain information that is pre-associated with the second image; and
  send the information to the application.

7. The computing system of claim 6, wherein the instructions configure the computing system to:
receive an application context indicator indicative of the application context of the application;
compare the first image to stored images by searching the selected image source to identify the second image; and
send the second image to the application.

8. The computing system of claim 6 wherein the selected image source comprises a first data store selected from a set of data stores, and wherein the instructions configure the computing system to:
prior to receiving the first image from the application, receive a plurality of images;
associate each of the plurality of images with corresponding information; and
store the plurality of images along with the associated information in the first data store.

9. The computing system of claim 8, wherein the instructions configure the computing system to:
generate a query that includes an indication of the first image;

obtain the second image by searching the first data store based on the query; and identify the information that is associated with the second image.

10. The computing system of claim 6, wherein the information is associated with the second image before the first image is received from the client device.

11. The computing system of claim 10, wherein information comprises information about an object depicted in the received image.

12. The computing system of claim 6, wherein the information comprises transactional information associated with performance of a transaction.

13. A method performed by a computing system, the method comprising:

receiving, from a client device that is remote from the computing system, image data representing a first image associated with an application on the client device;

receiving, from the client device in addition to the image data, context data that identifies a context of the application on the client device and is indicative of a user-selected operation associated with the first image in the application;

based on the first image and the application context, obtaining, from an image source, a second image that corresponds to the first image; and obtaining information associated with the second image; and sending the second image and the information to the client device.

14. The method of claim 13, further comprising:

based on the context, selecting the image source from a plurality of image sources.

15. The method of claim 14, wherein the selected image source comprises a data store associated with the computing system, and the method further comprises:

prior to receiving the first image from the client device, receiving a plurality of images;

associating each of the plurality of images with corresponding information; and storing the plurality of images along with the associated information in the data store.

16. The method of claim 13, and further comprising:

receiving, from the client device, a context indicator indicative of the context of the application;

determining the task based on the context; and obtaining the information based on the task.

17. The method of claim 13, and further comprising:

based on the context, selecting a subset of information from a set of information associated with the matching image; and sending the second image and the subset of information to the client device.

18. The method of claim 13, wherein the information comprises information about an object depicted in the first image.

19. The method of claim 18, wherein the object represents at least one of a person or a transaction item.

20. The method of claim 13, wherein the context data comprises non-image data received, from the client device, separate from the image data.

* * * * *